W. P. SCHOLL.
ANTISKIDDING DEVICE.
APPLICATION FILED JAN. 14, 1910.
982,304.
Patented Jan. 24, 1911.
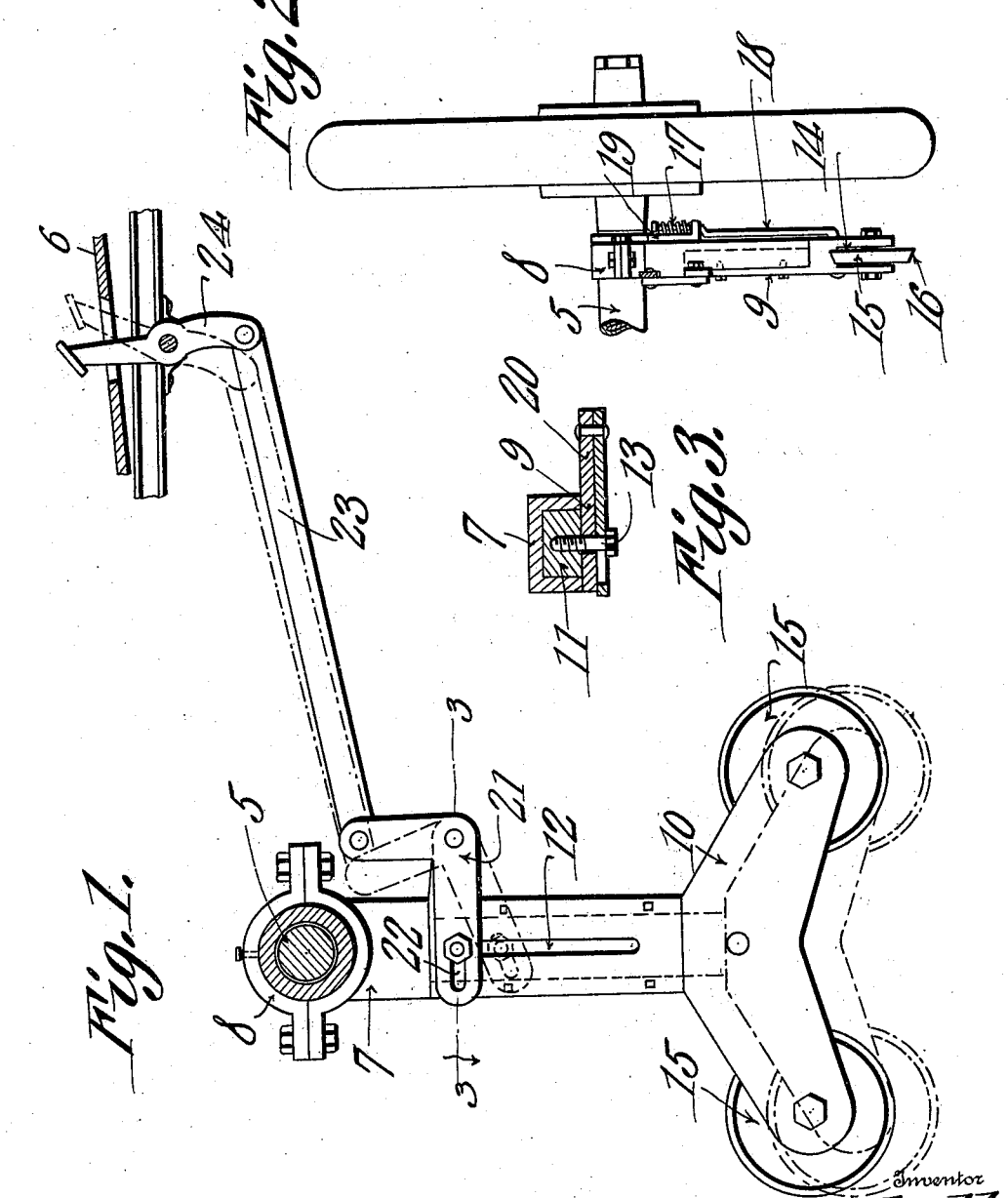
William P. Scholl.

UNITED STATES PATENT OFFICE.

WILLIAM P. SCHOLL, OF SOUTH BETHLEHEM, PENNSYLVANIA, ASSIGNOR OF ONE-HALF TO JAMES A. NEVINS, OF ALLENTOWN, PENNSYLVANIA.

ANTISKIDDING DEVICE.

982,304.  Specification of Letters Patent.  Patented Jan. 24, 1911.

Application filed January 14, 1910. Serial No. 538,067.

*To all whom it may concern:*

Be it known that I, WILLIAM P. SCHOLL, a citizen of the United States, residing at South Bethlehem, in the county of Northampton and State of Pennsylvania, have invented a new and useful Antiskidding Device, of which the following is a specification.

It is the object of the present invention to provide a novel and efficient anti-skidding device for vehicles and the device embodying the present invention is designed particularly for use on automobiles to prevent side skidding which is liable to occur on wet, slippery or very dusty roads.

The invention aims, among other things, to provide a device of the character which may be readily actuated without necessity of the operator of the machine removing his hands from the steering wheel or lever.

Further the invention aims to provide a device of the character which will not be liable to become displaced.

In the accompanying drawings:—Figure 1 is a view in side elevation of the device. Fig. 2 is a front elevation thereof. Fig. 3 is a horizontal sectional view on the line 3—3 of Fig. 1.

In the drawings, there is shown an automobile axle, 5 (preferably the rear axle) and a portion of the floor of the body of the automobile. A casing 7 is provided at its upper end with a sectional collar 8 which is clamped about the axle 5 near one of the wheels and the casing is in this manner supported in depending position from the said axle. The casing as is clearly shown in Fig. 3 of the drawings, is rectangular in a cross section, one side 9 thereof being removable and being bolted in place. A wheel carrying head 10 is formed with an upstanding stem 11 which fits exactly within the casing 7 and is slidable therein. To prevent complete removal of the stem from the casing, the wall or side 9 of the latter is formed with a slot 12 and a stud bolt 13 is threaded into the stem and engages through and works in the said slot 12. It will be observed from an inspection of the Fig. 1 of the drawings that the stem projects from the head 10 at a point midway between the ends thereof and that the said head is located in a plane parallel to the plane of the wheel at the adjacent end of the axle (see Fig. 2). Further the head 10 at each end is bifurcated as at 14 and a wheel 15 is journaled in each bifurcation. Each of the wheels 15 has its periphery 16 so beveled that the wheel as a whole has the form of a truncated cone the base of which is presented to the adjacent vehicle wheel. At this point it will be stated that the head 10 is lowered so as to bring the wheel 15 into contact with the road surface, the sharp edges of the peripheries of the wheels will dig into the road surface and side skidding will be prevented.

Normally the head is held elevated through the medium of a spring 17 which is mounted upon a rod 18 at the upper end thereof. This rod 18 engages slidably through a bracket 19 which is clamped to and depends from the axle 5. The lower end of the rod 18 is secured to the head 10 at a point midway the ends of the same and the spring 17 bears at its lower end against the bracket 19 and at its upper end against a head or stop at the upper end of the said rod 18.

The side or wall 9 of the casing of the device is formed with an extension 20 upon which is mounted to rock, an angle lever 21 one arm of which normally extends approximately horizontal and is slotted as at 22; the other arm extends approximately vertical. The stud bolt 13 engages through the slot of the first mentioned arm so that rocking of the angle lever will result in an up or down movement of the head 10 and its stem 11 upon which latter the stud bolt 13 is carried as heretofore stated. In order that the angle lever may be manually rocked, a rod 23 is pivoted at its rear end to the upper end of the vertical arm of the angle lever and its forward end to the lower end of a foot lever 24 which is mounted in the floor 6 of the automobile as shown in Fig. 1 of the drawings.

It is preferable that one of the above described devices be arranged at each side of the vehicle and that the devices be independently operable so that skidding either to the right or left may be prevented. It will be understood of course that the foot lever 24 is to be forwardly rocked to lower the wheel carrying head against the tension of the spring 17 and that the said spring will act to automatically return the head to elevated position when the foot lever is released.

What is claimed is:—

In a device of the class described a casing, one wall of said casing being removable and being slotted, a head having a stem slidably fitted in said casing, wheels carried by the stem, a stud carried by the stem and engaging through the slot in the said removable wall of the casing, an angle lever mounted to rock on said wall and connected to said stud, a foot lever, and connection between said angle lever and foot lever.

In testimony that I claim the foregoing as my own, I have hereto affixed my signature in the presence of two witnesses.

WILLIAM P. SCHOLL.

Witnesses:
H. G. SCHOLL,
THEO. J. SCHOLL.